US008328003B2

(12) United States Patent
Webster et al.

(10) Patent No.: US 8,328,003 B2
(45) Date of Patent: Dec. 11, 2012

(54) SHOPPING CART CONVEYOR WITH GATE ASSEMBLY

(75) Inventors: Mark R. Webster, Hubertus, WI (US); Patrick J. Kelnhofer, Milwaukee, WI (US); Gene M. Barth, Thiensville, WI (US)

(73) Assignee: Pflow Industries, Inc., Milwaukee, WI (US)

( * ) Notice: Subject to any disclaimer, the term of this patent is extended or adjusted under 35 U.S.C. 154(b) by 212 days.

(21) Appl. No.: 12/646,624

(22) Filed: Dec. 23, 2009

(65) Prior Publication Data

US 2011/0147164 A1 Jun. 23, 2011

(51) Int. Cl.
*B65G 19/02* (2006.01)
*B65G 43/00* (2006.01)

(52) U.S. Cl. .................. 198/732; 198/860.4; 104/172.3; 340/568.5; 194/905

(58) Field of Classification Search .................. 198/732, 198/321, 860.4; 186/58; 194/905; 340/568.5; 104/172.3
See application file for complete search history.

(56) References Cited

U.S. PATENT DOCUMENTS

| | | | |
|---|---|---|---|
| 2,109,210 | A | 2/1938 | Dunlop |
| 2,802,427 | A | 8/1957 | Costa |
| 2,965,049 | A | 12/1960 | Royer |
| 3,305,064 | A | 2/1967 | Mullis et al. |
| 3,318,432 | A | 5/1967 | Mullis et al. |
| 3,395,784 | A | 8/1968 | Kanarek |
| 3,446,315 | A | 5/1969 | Close |
| 3,580,376 | A | 5/1971 | Loshbough |
| 3,655,013 | A | 4/1972 | Weller |
| 3,656,636 | A | 4/1972 | Konstantin |
| 3,832,953 | A | 9/1974 | Aaron |
| 3,837,289 | A | 9/1974 | Marshman et al. |
| 3,861,514 | A | 1/1975 | Ling |
| 3,947,832 | A | 3/1976 | Rosgen et al. |
| 4,206,708 | A | 6/1980 | Behle |
| 4,235,327 | A | 11/1980 | Heusler et al. |
| 4,326,622 | A | 4/1982 | Ellzey |
| 4,424,893 | A | 1/1984 | Gillet |
| 4,438,830 | A | 3/1984 | Born |
| 4,518,072 | A | 5/1985 | Muellner et al. |
| 4,681,207 | A | 7/1987 | Goto et al. |
| 5,476,156 | A | 12/1995 | Gerber |
| 5,529,163 | A | 6/1996 | Decker et al. |
| 5,572,930 | A | 11/1996 | Hein |
| 5,785,165 | A | 7/1998 | Stahlhut et al. |
| 5,923,005 | A | 7/1999 | Blondiau et al. |
| 5,996,767 | A | 12/1999 | Misawa |

(Continued)

FOREIGN PATENT DOCUMENTS

| | | |
|---|---|---|
| CH | 403224 | 11/1965 |

(Continued)

*Primary Examiner* — Mark A Deuble
(74) *Attorney, Agent, or Firm* — Michael Best & Friedrich LLP

(57) ABSTRACT

A conveyor for moving a shopping cart between a first location and a second location. The conveyor including a movable conveyor that is adapted to engage and move the shopping cart along a path, and a gate assembly including a door that is movable between an open position allowing passage of the shopping cart along the path, and a closed position inhibiting passage of the shopping art along the path. The door is adapted to move from the closed position to the open position as the shopping cart approaches, and is adapted to move back to the closed position before the shopping cart has passed the door.

18 Claims, 7 Drawing Sheets

U.S. PATENT DOCUMENTS

| | | | | |
|---|---|---|---|---|
| 6,138,815 | A | 10/2000 | Reiners et al. | |
| 6,334,522 | B2 | 1/2002 | Haruta et al. | |
| 6,490,979 | B1 | 12/2002 | Pfleger et al. | |
| 6,644,210 | B1 | 11/2003 | Pfleger et al. | |
| 7,346,956 | B2 | 3/2008 | Andre | |
| 7,453,358 | B2 * | 11/2008 | Webster | 340/568.5 |
| 2006/0011220 | A1 * | 1/2006 | Mueller | 134/45 |
| 2007/0012340 | A1 * | 1/2007 | Jones et al. | 134/45 |
| 2007/0205859 | A1 * | 9/2007 | Webster | 340/5.7 |
| 2008/0210268 | A1 * | 9/2008 | Metheny et al. | 134/95.2 |

FOREIGN PATENT DOCUMENTS

| | | |
|---|---|---|
| DE | 1249765 | 9/1967 |
| DE | 2456791 | 8/1976 |
| DE | 2916818 | 11/1980 |
| EP | 0012149 | 4/1979 |

* cited by examiner

SHOPPING CART CONVEYOR WITH GATE ASSEMBLY

BACKGROUND

The present invention relates to conveyor systems, and more specifically to conveyer systems for shopping carts.

Currently, many large department stores occupy single floor buildings that include many different product departments and thus have a footprint that covers tens of thousands of square feet. In these large department stores, shoppers typically use shopping carts to carry selected merchandise throughout the store while the shopper continues to select merchandise from the various departments within the store. Since a shopper may be selecting a large number of items having substantial weight, shopping carts are essential in the current department store environment.

Large department stores are commonly located in suburban areas where enough land is available to build a single-story store large enough to include all of the merchandise to be offered by the retailer. Some large department store chains have been unable to open stores in large, populated urban areas due to the unavailability of large blocks of single-floor retail space. However, in these same urban areas there are often a number of multi-floor vacant buildings that would be large enough to accommodate the floor space required by the department store. Department stores are reluctant to utilize these multi-floor buildings due to the inability of the department store to transport shopping carts between the various floors of a multi-level store. Although elevators can move shopping carts between the various floors of a multi-floor store, elevators are unable to handle the large number of consumers typically found in one of the large chains of department stores.

In order to address this problem, shopping cart conveyors have been designed to move shopping carts on an inclined conveyor along side an escalator. One such shopping cart conveyor is disclosed in U.S. Pat. No. 6,490,979, assign to Pflow Industries of Milwaukee, Wis., which is incorporated herein by reference in its entirety. In the Pflow patent, the shopping cart conveyor moves specially-equipped shopping carts between floors of a building.

SUMMARY

Shopping cart conveyors typically are designed to accommodate only shopping carts of a certain design. These conveyors might not function properly if other shopping carts are used. Accordingly, it would be beneficial if the shopping cart conveyors were designed so that other shopping carts were inhibited from being loaded onto the conveyor.

The present invention provides such a shopping cart conveyor that inhibits the loading of a non-compliant shopping cart onto the conveyor.

In one embodiment, the invention provides a conveyor for moving a shopping cart between a first location and a second location. The conveyor includes a movable conveyor that is adapted to engage and move the shopping cart along a path, and a gate assembly including a door that is movable between an open position allowing passage of the shopping cart along the path, and a closed position inhibiting passage of the shopping art along the path. The door is adapted to move from the closed position to the open position as the shopping cart approaches, and is adapted to move back to the closed position before the shopping cart has passed the door.

In another embodiment, the invention provides a conveyor for moving a shopping cart from a first location to a second location that defines a downstream direction. The conveyor includes a first gate assembly that includes a door movable between an open position allowing passage in the downstream direction and a closed position inhibiting passage in the downstream direction, and a second gate assembly positioned downstream of the first gate assembly and including a door movable between an open position allowing passage in the downstream direction and a closed position inhibiting passage in the downstream direction.

In another embodiment, the invention provides a method of operating a shopping cart conveyor having a movable conveyor adapted to engage and move the shopping cart along a path, and a gate assembly including a door. The method includes, advancing a shopping cart toward the door with the door in a closed position, opening the door from the closed position to an open position, moving at least a portion of the shopping cart past the door, and closing the door. Between the opening step and the closing step, the shopping cart is moved a distance less than a length of the shopping cart.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
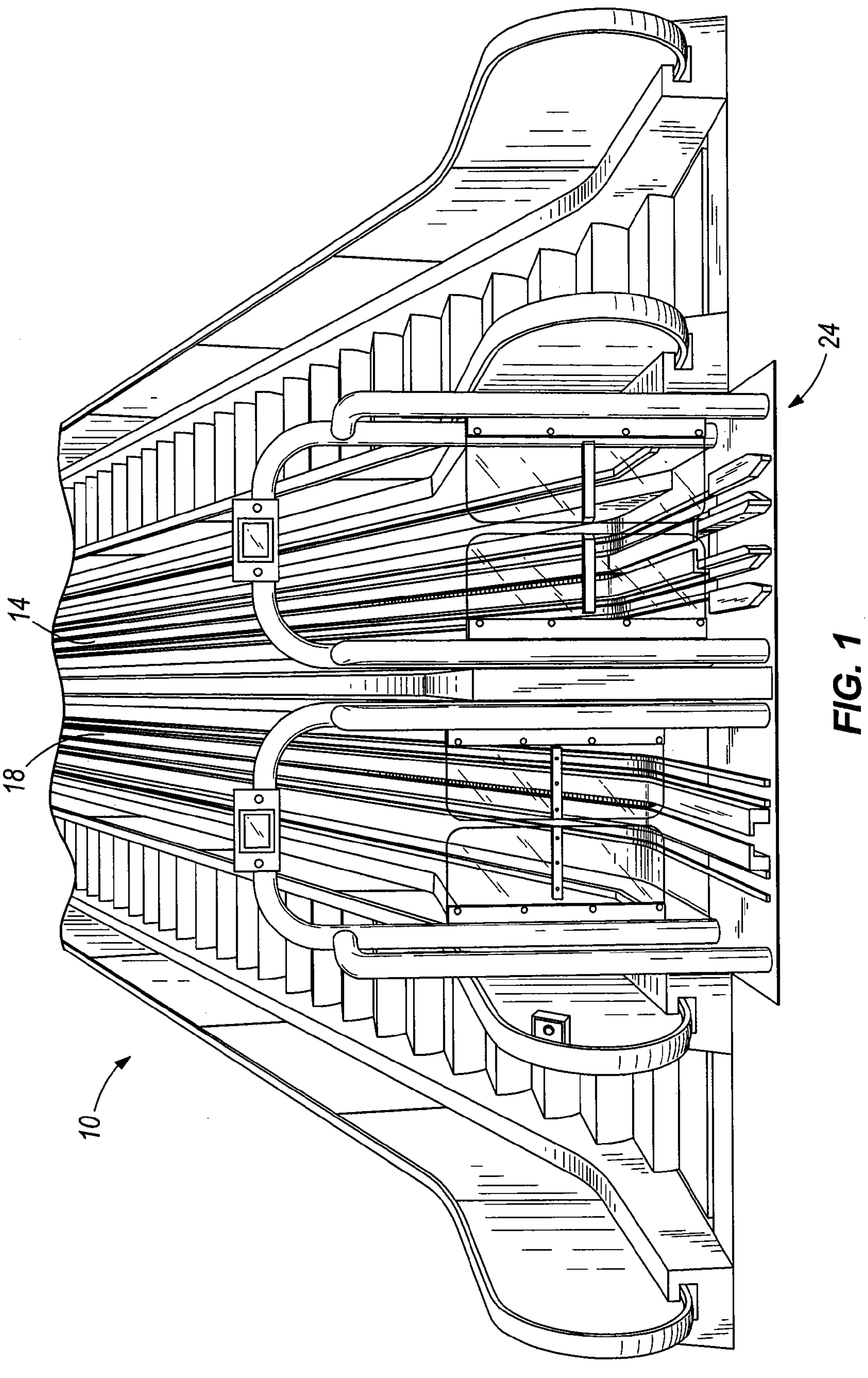
FIG. 1 is a perspective view of a shopping cart conveyor system having a gate assembly for restricting access to the system.

FIG. 1 illustrates a conveyor 10 for moving shopping carts between various locations. In the illustrated embodiment, the conveyor 10 is inclined to move the shopping carts between floors or levels of a department store or the like. The illustrated conveyor 10 includes a first track 14 for moving the shopping cart 12 between a lower level and an upper level, and a second track 18 for moving the shopping cart 12 from the upper level to the lower level. The conveyor 10 may include multiple motors, gears, pulleys, engaging members, and the like. Such components and their respective functions are described in detail in U.S. Pat. No. 6,490,979. In some embodiments, the conveyor 10 is provided with a gate assembly 24 at entry and exit points of both the first track 14 and the second track 18.

Figure 2:
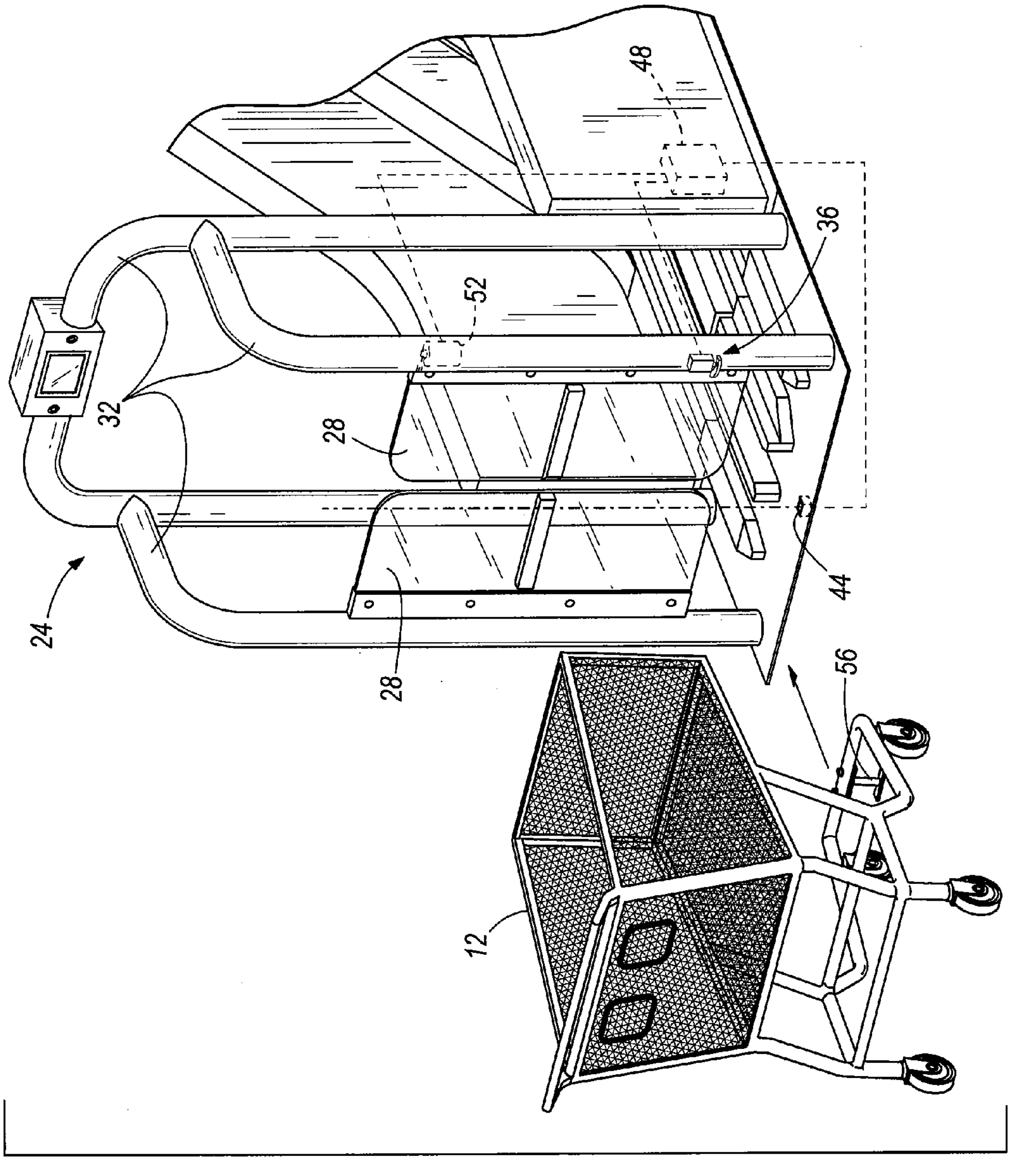
FIG. 2 is an enlarged perspective view of a portion of the gate assembly of FIG. 1.

The gate assembly 24 illustrated in FIG. 2 is an entry gate and includes a door 28 that is movable between an open position, allowing access to the track, and a closed position, inhibiting access to the track. In the illustrated embodiment, the gate assembly 24 includes two doors 28. The operation of one of the doors 28 will be described herein. The door 28 is mounted for pivotal movement relative to the frame 32. The pivotal movement of the door 28 is only given as a single example. The door 28 can include virtually any type of configuration that provides an open position and a closed position. Single or multiple doors 28 may be used with the invention, and in some embodiments the gate assembly 24 includes a completely different configuration for selectively preventing entry of shopping carts, other objects or beings to the tracks 14, 18 of the conveyor 10.

In the illustrated embodiment, the door 28 is provided with a lock 36. The lock 36 allows the door 28 to be configurable in either a locked state or an unlocked state. The lock 36 may consist of virtually any type of device capable of holding the door 28 in a fixed position. The lock 36 in FIG. 2 is a simple solenoid fixed to the frame 32. The solenoid includes a movable member for selectively engaging and locking the door 28.

With continued reference to FIG. 2, the gate assembly 24 is provided with a sensor 44 that is positioned to detect the shopping cart 12. The sensor 44 communicates via a signal, such as an electrical signal or wireless signal, with a controller 48. The controller 48 in turn communicates with the lock 36. Upon detection of the presence of a shopping cart, the sensor 44 sends a signal to the controller, and the controller 48 sends an "unlock" signal to the lock 36, which triggers the lock 36 to switch from the locked state to the unlocked state. In some embodiments, the lock 36 is biased or otherwise held in the locked state. In other embodiments, a "lock" signal is sent from the controller 48 to the lock 36 for re-locking.

The gate assembly 24 is further provided with a drive mechanism 52 for moving the door 28 between the closed and open positions. In the illustrated embodiment, the drive mechanism 52 is a motor located within the frame 32. The drive mechanism 52 is configured to receive an "open" signal sent from the controller 48. The "open" signal can be independent or dependent upon the signal sent to the lock 36. For example, in some embodiments, the signal sent by the controller for unlocking the lock 36 begins a delay timer function within the controller, which delays the "open" signal. Upon receiving the "open" signal from the controller 48, the drive mechanism 52 is energized to move the door 28 from the closed position to the open position, allowing entry to the conveyor 10. In other embodiments, the lock and motor can be incorporated into a single device, such as a motor with a friction clutch or a motor coupled to a locking gear train.

Once opened, the door 28 is held in the open position (e.g., by the lock 36, the drive mechanism 52, or another holding means) for a fixed amount of time in some embodiments. The controller 48 is programmable to set or change the amount of time that the door 28 is held in the open position after receiving the signal from the sensor 44 indicating the presence of the shopping cart 12. Alternatively, the closing of the door 28 transpires upon a separate "close" signal from the controller 48. The "close" signal may be generated by an auxiliary sensor indicating the passing of the shopping cart 12 through the door 28, but may also be generated by the sensor 44, a timer function in the controller 48, or any combination thereof.

The sensor 44 of FIG. 2 is arranged in a generally vertical direction for sensing in a generally upward direction. The sensor 44 of FIG. 2 is positioned near the bottom of the gate assembly 24 just outside the door 28. In some embodiments, the sensor 44 is protected from physical contact or interference by positioning it partially or wholly in the floor or bottom surface of the gate assembly 24. The sensor 44 and controller 48 are configured to detect or sense the shopping cart 12. In some embodiments, each authorized shopping cart 12 to be used with the conveyor 10 is provided with an identifier, which identifies to the sensor 44 that it is an authorized shopping cart. This helps prevent entry of any cargo to the tracks 14, 18 other than the shopping cart 12. In some embodiments, the shopping cart 12 includes an engagement bracket 56 as disclosed in U.S. Pat. No. 6,490,979. The engagement bracket 56 is used to provide a point of engagement to the tracks 14, 18, but may also be employed as the identifier.

The sensor 44 may be selected from many various types, depending on the identifier. For example, the sensor 44 may be ultrasonic, optical, infrared, mechanical, radar, magnetic or Hall effect, etc. In some embodiments, the sensor 44 is configured as a radio frequency identification (RFID) reader for identifying RFID tags or labels (identifiers) that may be placed on the shopping carts 12.

Figure 3:
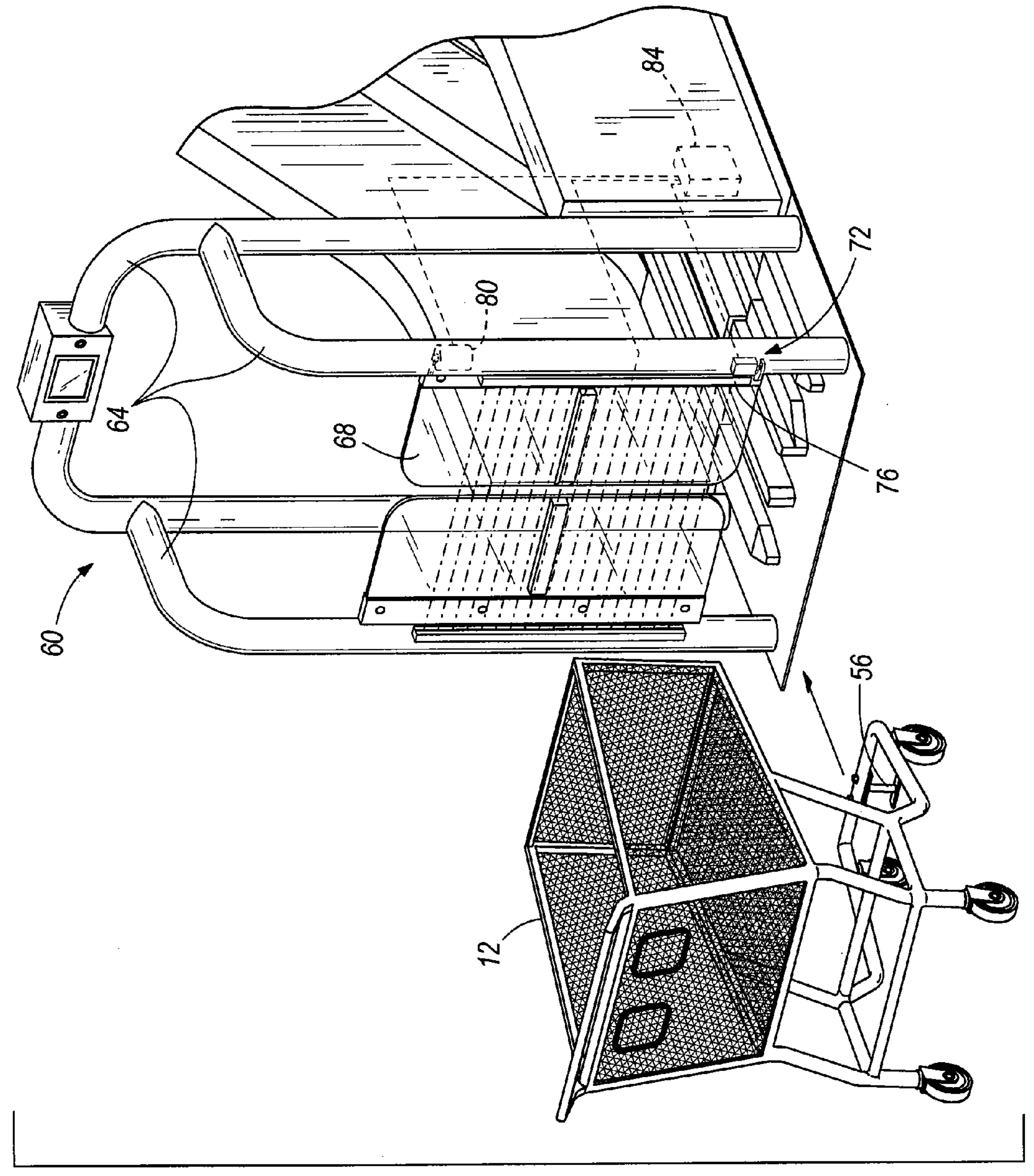
FIG. 3 is a perspective view of a second embodiment of the gate assembly.

FIG. 3 illustrates a different gate assembly 60 for use with the conveyor 10. The gate assembly 60 includes a frame 64 and a door 68, similar to the previous embodiment. A lock 72 permits the door 68 to be configured in either a locked or an unlocked state. In the illustrated embodiment, a sensor 76 is configured to detect the presence of the shopping cart 12 proximate the conveyor 10.

The sensor 76 of FIG. 3 is positioned near the lateral sides of the gate assembly 60. The sensor 76 is shown with an exemplary shape, which is tall and narrow. As described above with reference to the previous embodiment, the sensor 76 may employ any one of a number of sensory technologies to detect the presence of the shopping cart 12. In some embodiments, multiple sensory methods are used in combination.

As with the previous embodiment, a drive mechanism 80 is operable to open the door 68 from the closed position to the open position. A controller 84 receives a signal from the sensor 76 when the shopping cart 12 is detected near the conveyor 10. In some embodiments, the sensor 76 also sends a signal to the controller 84 when the shopping cart 12 is not detected (indicating absence of the shopping cart 12). Upon detection and identification of the presence of the shopping cart 12 by the sensor 76 and the controller 84, the controller 84 sends a signal to either the lock 72, the drive mechanism 80 or both.

Figure 4:
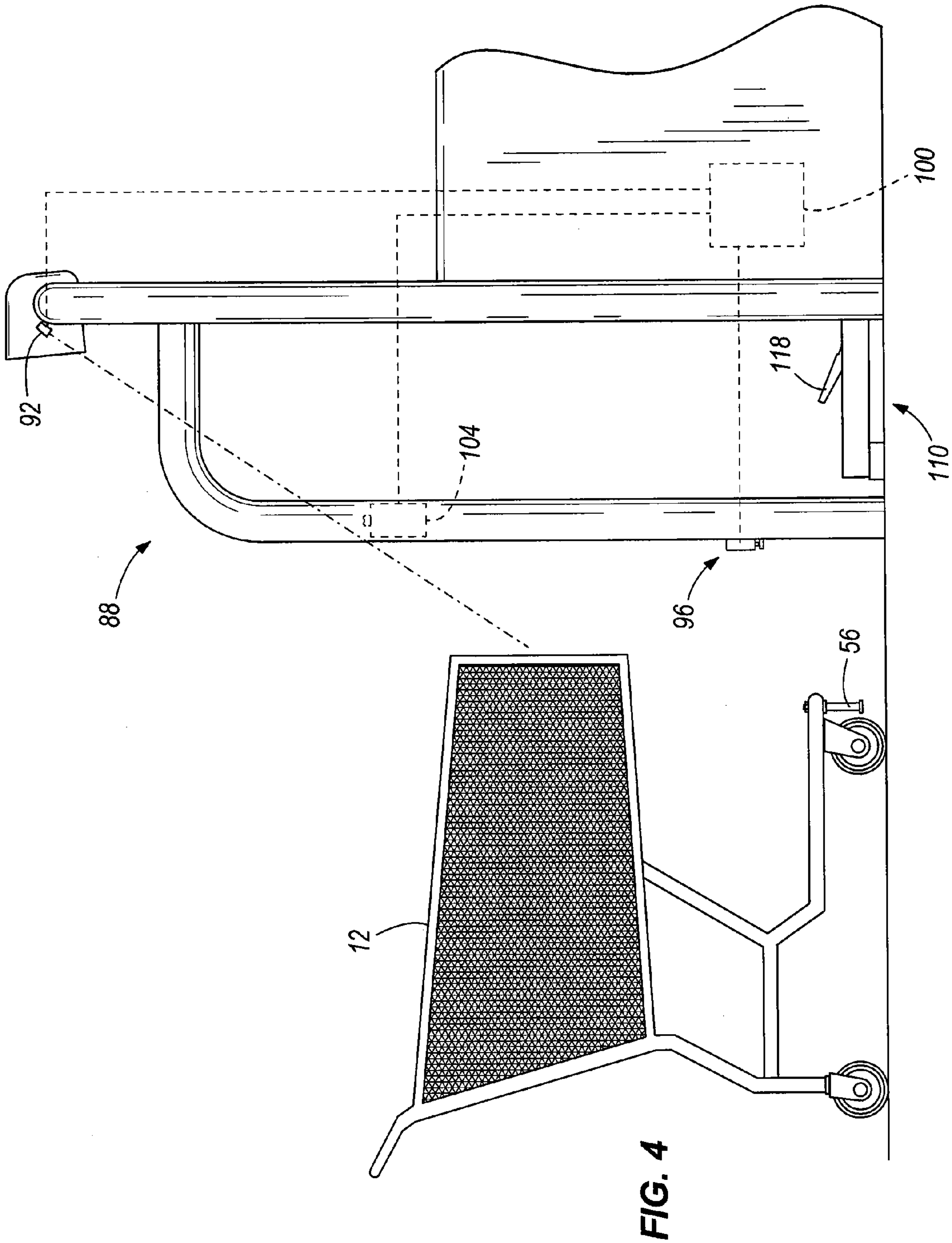
FIG. 4 is a perspective view of a third embodiment of the gate assembly.

FIG. 4 illustrates a gate assembly 88 including a sensor 92. The sensor 92 may vary in type and field of view as described above. The sensor 92 is positioned atop the gate assembly 88 and is configured to sense whether or not the shopping cart 12 is present. A lock 96, a controller 100, and a drive mechanism 104 are provided for operation as described above with reference to the previous embodiments.

In another embodiment that is not illustrated, the sensor can be positioned at least partially in the center track (FIG. 1) that is adapted to receive the engagement bracket 56. In this embodiment, it is less likely that the sensor will be activated by something other than an authorized shopping cart (i.e., one having an engagement bracket). In this embodiment, the center track would need to be extended outward from the conveyor so that the engagement bracket can be inserted into the center track and sensed by the sensor before the shopping cart engages the doors.

In addition, although the above-described and illustrated embodiments disclose use of an electronic sensor, it should be understood that the sensor could be mechanical. For example the sensor could be a lever that is moved by engagement with a shopping cart (e.g., the engagement bracket 56), and the lever could be coupled to a locking device to unlock the gate.

Figure 5:
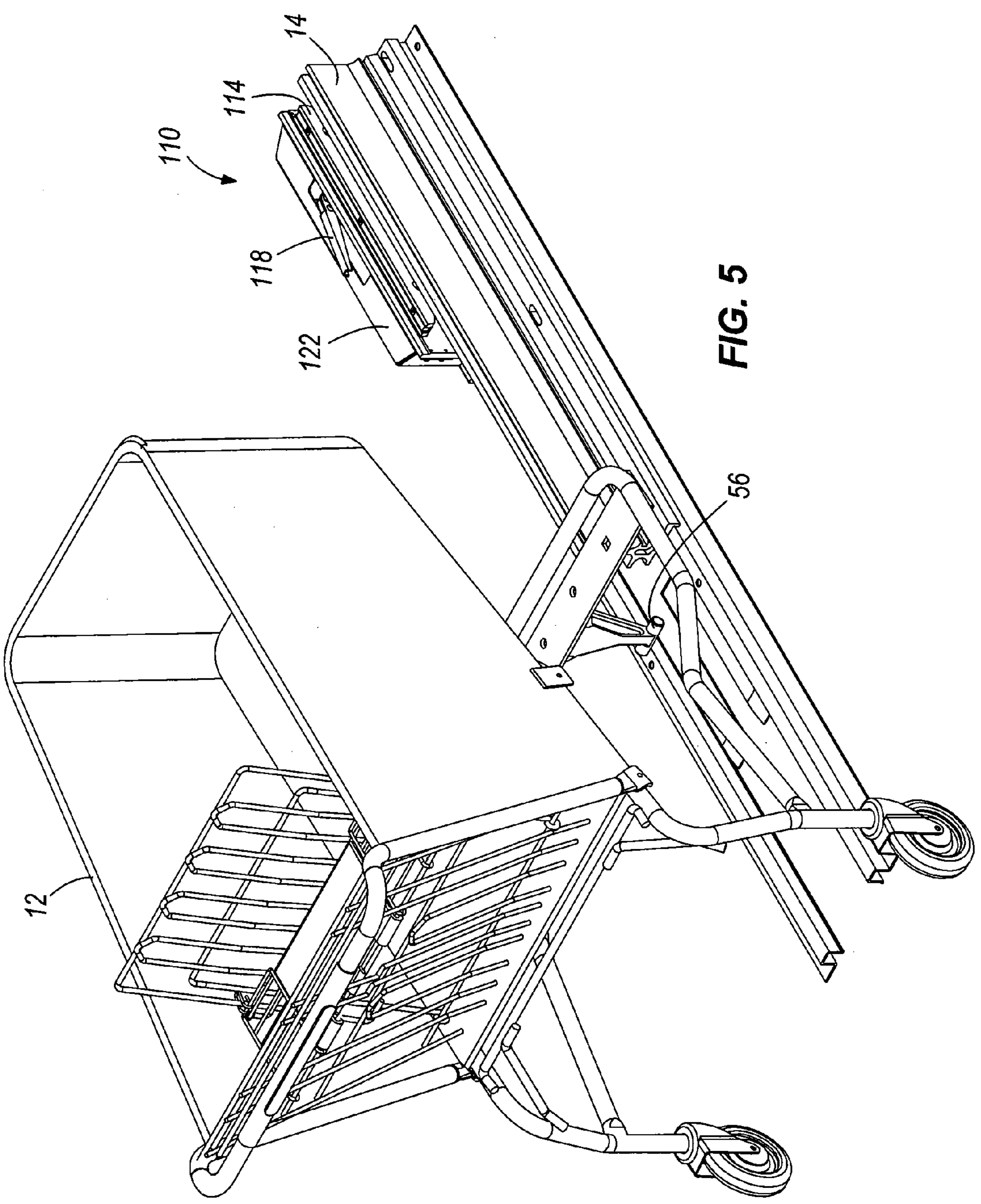
FIG. 5 is a perspective view of a fourth embodiment of the gate assembly.
Figure 6:
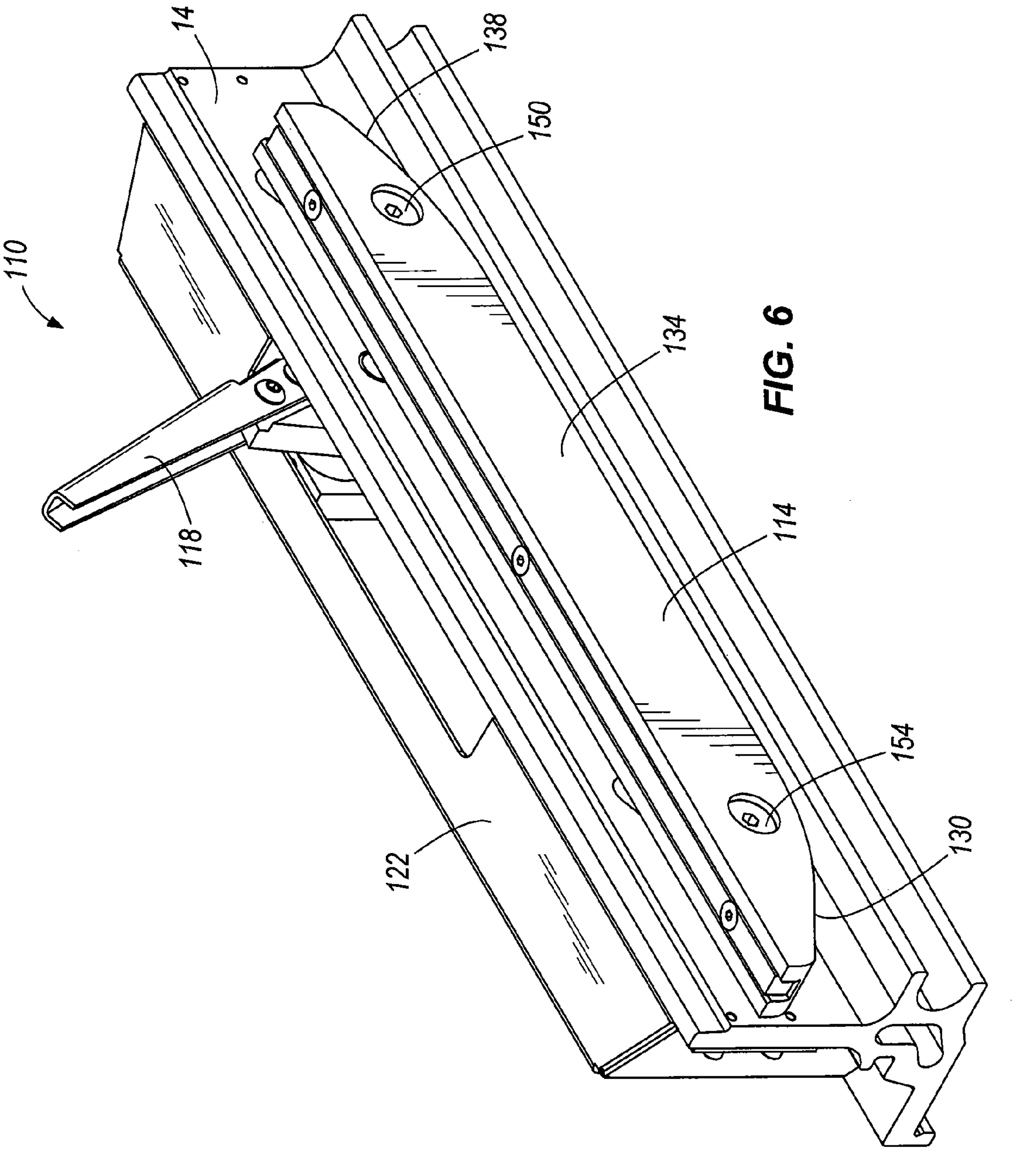
FIG. 6 is an enlarged perspective view of the gate assembly illustrated in FIG. 5.
Figure 7:
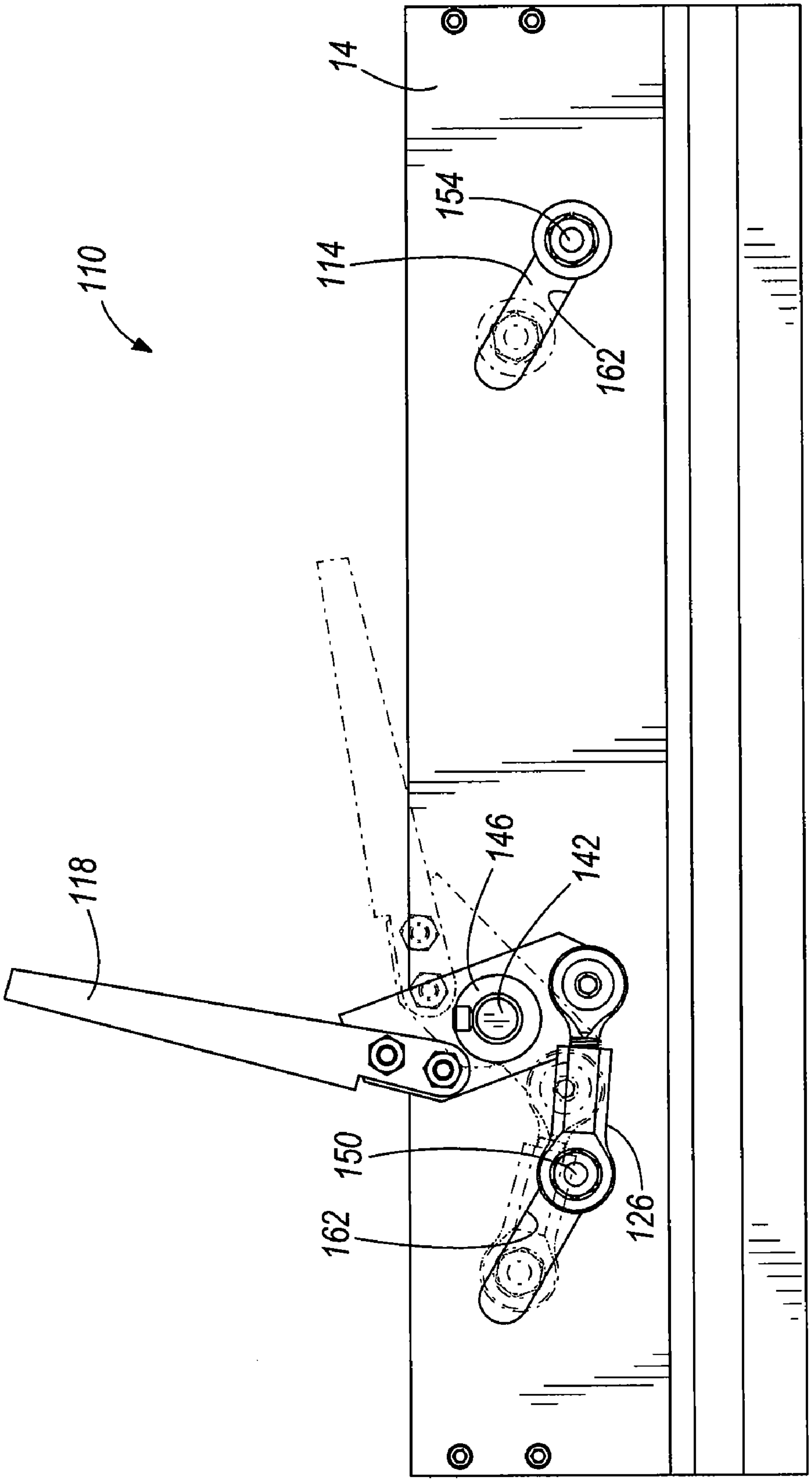
FIG. 7 is a side view of the gate assembly illustrated in FIG. 5 with a cover removed.

FIGS. 5-7 illustrate another gate assembly 110 that blocks the path of the shopping cart 12 at the entry and exit points of the first track 14 and the second track 18. The gate assembly 110 is also shown in FIG. 4 used together with the previously described gate assembly 88. Additionally, the gate assembly 110 may be used with any of the other gate assemblies 24, 60, as desired.

The gate assembly 110 in FIGS. 5-7 is attached to the track 14 and includes a sensor in the form of a lift bar 114, a door in the form of a lever 118, a housing 122, and an actuator in the form of a linkage 126 connecting the lever 118 and the lift bar 114 (see FIG. 7). With specific reference to FIG. 5, the entry point of the first track 14 is shown. The shopping cart 12 is about to enter the first track 14 and the engagement member 56 is aligned appropriately. The shopping cart 12 is illustrated with the front wheels removed so that the first track 14 and the engagement member 56 are clearly visible.

Referring to FIG. 6, the lift bar 114 includes an entry end 130, a body portion 134, and an exit end 138, and is coupled to the first track 14 by the linkage 126 (see FIG. 7) such that the lift bar 114 moves with respect to the first track 14. The entry end 130 and exit end 138 taper to smaller thicknesses than the body portion 134. In other embodiments, the sensor may be other than a lift bar 114. For example, the sensor could be a touchless sensor (e.g., IR sensor, magnetic sensor) or another type of contact sensor such as a lever or ramp. The engagement member 56 of the shopping cart 12 is a form of an identifier that the sensor is able to sense. In the illustrated embodiment, the lift bar 114 senses the engagement member 56 through physical contact and the lifting motion. In other embodiments, the sensor could sense the identifier in another corresponding way (e.g., magnetic pickup for a magnetic sensor).

With reference to FIG. 7, the lift bar 114 also includes a first pin 150 and a second pin 154. Each pin 150, 154 includes a bearing portion (not visible) that rides in a corresponding slot 162 formed in the first track 14. The lift bar 114 rides in the slots 162 such that it moves in response to the engagement member 56.

The illustrated housing 122, shown in FIG. 6, inhibits access to the lever 118 and the linkage 126. The housing 122 also inhibits contaminates and/or outside objects (e.g., carts, packages, customers) from fouling or otherwise damaging the linkage 126.

Turning now to FIG. 7, the illustrated lever 118 is mounted to the first track 14 with a pivot member 142. The illustrated pivot member 142 is a shaft that is directly connected to the first track 14. In other embodiments, the pivot member 142 may be a fastener or may be attached to the first track 14 with a fastener. A bearing 146 is positioned between the lever 118 and the pivot member 142 to allow the lever 118 to rotate freely about the pivot member 142.

The illustrated linkage 126 connects the first pin 150 to the lever 118 such that the motion of the lift bar 114 is translated to the lever 118 through the linkage 126.

Operation of the gate assembly 110 will be described with respect to FIGS. 5-7. If no shopping cart 12 is entering or exiting the gate assembly 110, the lever 118 is in a closed position (pictured in FIGS. 5-7) such that the shopping cart 12 is inhibited from accessing the first track 14. When in the closed position, the lever 118 is operable to contact the frame of the shopping cart 12 to inhibit access to the first track 14. In other embodiments, the lever 118 may be operable to contact the wheels or another part of the shopping cart 12.

As the shopping cart 12 enters the first track 14, the engagement member 56 contacts the lift bar 114 at the entry end 130. As the shopping cart 12 continues to enter the first track 14, the engagement member 56 is forced toward the body portion 134 of the lift bar 114 such that the lift bar 114 is forced upward and in the direction of the motion of the shopping cart 12 (up and right in FIGS. 5 and 6). As the lift bar 114 is forced by the engagement member 56, the first pin 150 and second pin 154 slide within the slots 162 and the linkage 126 actuates the lever 118 toward an open position (dotted lines in FIG. 7) where access to the first track 14 is provided.

The lever 118 is maintained in the open position as long as the engagement member 56 is in contact with the body portion 134 of the lift bar 114 such that a portion of the shopping cart 12 may pass over the lever 118 and gain access to the first track 14.

When the engagement member 56 exits the body portion 134 of the lift bar 114 and enters the exit end 138, the lift bar 114 is allowed to move downward such that the linkage 126 actuates the lever 118 toward the closed position. Once the engagement member 56 exits the exit end 138, the lever 118 is in the closed position and inhibits another shopping cart 12 from accessing the first track 14. In the illustrated construction, the lever 118 returns to the closed position before the shopping cart 12 has fully passed the lever 118. In other words, when the engagement member 56 exits the lift bar 114 and the lever 118 returns to the closed position, a portion of the shopping cart 12 may still be positioned over the lever 118. The frame of the shopping cart 12 is arranged such that the lever 118 will only substantially contact the front portion of the frame such that once the front portion of the shopping cart 12 has passed the gate assembly 110, the lever 118 may be moved back to the closed position without inhibiting the shopping cart 12 from accessing the first track 14.

Providing a door (e.g., the lever 118) that is operable to close before the shopping cart 12 has fully passed the door or gate assembly provides a significant advantage. In some situations, a second shopping cart (dissimilar from the shopping cart 12) without an engagement member 56 may attempt to access the first track 14. If the second shopping cart were to closely follow the shopping cart 12 and attempt to gain access to the first track 14, prior art gate assemblies would have allowed the second shopping cart to access the first track 14. The prior art doors remain in the open position for the entire length of the shopping cart 12 thereby allowing a window of time for the second shopping cart to access the first track 14. The gate assembly 110 provides a door (e.g., the lever 118) that moves to the closed position before the entire length of the shopping cart 12 has passed. In this way, there is no window of time after the shopping cart 12 has passed that the second shopping cart could access the first track 14. As such, the gate assembly 110 can inhibit non-conforming shopping carts from accessing the first track 14 and causing problems (e.g., a shut down of the conveyor system).

It is noted that the above description of various embodiments of the invention focuses on the provision of a gate at the inlet to a shopping cart conveyor. Such a gate can be at the bottom end of an upward conveyor, or at the top end of a downward conveyor.

In summary, the invention provides, among other things, a system and method for controlling access to a conveyor for shopping carts. Various features and advantages of the invention are set forth in the following claims.

What is claimed is:

1. A conveyor for moving a shopping cart between a first location and a second location, the conveyor comprising:

a movable conveyor adapted to engage and move the shopping cart along a path; and a gate assembly including a door movable between an open position allowing passage of the shopping cart along the path and a closed position inhibiting passage of the shopping art along the path, wherein the door is adapted to move from the closed position to the open position as the shopping cart approaches, and is adapted to move back to the closed position before the shopping cart has passed the door.

2. The conveyor of claim 1, further comprising a sensor that senses the presence of the shopping cart and communicates with the door to move the door from the closed position to the open position.

3. The conveyor of claim 2, wherein the sensor is configured to hold the door in open position for a period of time shorter than the time it takes for the shopping cart to pass the door.

4. The conveyor of claim 2, wherein the sensor is a touchless sensor.

5. The conveyor of claim 2, wherein the sensor is a contact sensor.

6. The conveyor of claim 2, wherein the shopping cart includes an identifier, and the sensor is configured to sense the presence of the identifier.

7. The conveyor of claim 1, further comprising a track operable to guide the wheels of the shopping cart between the first location and the second location.

8. The conveyor of claim 1, wherein the gate assembly is a downstream gate assembly and conveyor further includes an upstream gate assembly upstream of the track.

9. A conveyor for moving a shopping cart from an entry to an exit spaced from the entry in a downstream direction, the conveyor comprising:

a first gate assembly positioned adjacent the entry and including a door movable between an open position allowing passage in the downstream direction and a closed position inhibiting passage in the downstream direction; and a second gate assembly positioned downstream of the first gate assembly adjacent the first gate assembly, and including a door movable between an open position allowing passage in the downstream direction and a closed position inhibiting passage in the downstream direction.

10. The conveyor of claim 9, wherein the door of first gate assembly includes a swinging door.

11. The conveyor of claim 10, wherein the swinging door is positioned above the track to substantially block a person from entering the conveyor assembly.

12. The conveyor of claim 9, further comprising a track, and wherein the door of second gate assembly substantially blocks a shopping cart when in the closed position.

13. A method of operating a shopping cart conveyor having a movable conveyor adapted to engage and move the shopping cart along a path, and a gate assembly including a door, the method comprising:

advancing a shopping cart toward the door with the door in a closed position;

opening the door from the closed position to an open position;

moving at least a portion of the shopping cart past the door; and closing the door, wherein between the opening step and the closing step, the shopping cart is moved a distance less than a length of the shopping cart.

14. The method of claim 13, wherein advancing includes pushing.

15. The method of claim 13, wherein opening the door includes sensing the presence of the shopping cart.

16. The method of claim 15, wherein sensing includes engaging a portion of the shopping cart with a sensor.

17. The method of claim 15, wherein sensing includes sensing an identifier on the cart.

18. The method of claim 13, wherein closing includes disengaging a portion of the shopping cart from the sensor.

* * * * *